(12) United States Patent
Sasse et al.

(10) Patent No.: US 6,266,958 B1
(45) Date of Patent: Jul. 31, 2001

(54) STATOR WHEEL FOR A HYDRODYNAMIC TORQUE CONVERTER

(75) Inventors: Christoph Sasse; Hans-Wilhelm Wienholt, both of Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/410,720

(22) Filed: Oct. 1, 1999

(30) Foreign Application Priority Data

Oct. 5, 1998 (DE) ............................................. 198 45 692

(51) Int. Cl.[7] ................. F16D 33/00; F01D 5/22
(52) U.S. Cl. ............... 60/362; 60/365; 416/180; 416/197 C; 416/193 R; 416/196 A; 416/223 R; 416/243; 416/DIG. 5
(58) Field of Search ................ 60/361, 362, 365; 416/180, 197 C, 193 R, 194, 196 A, DIG. 5, 223 R, 243

(56) References Cited

U.S. PATENT DOCUMENTS

| | | | |
|---|---|---|---|
| 2,393,470 | 1/1946 | Jandasek | 60/54 |
| 5,562,419 | * 10/1996 | Crall et al. | 416/190 |
| 5,755,557 | * 5/1998 | Alizadeh | 416/193 R |
| 5,836,157 | * 11/1998 | Kosuge | 60/362 |

FOREIGN PATENT DOCUMENTS

| | | | |
|---|---|---|---|
| 1 127 168 | 12/1957 | (DE) . | |
| 0 846 893 | 12/1997 | (EP) | F16H/41/26 |
| 0 846 894 | 12/1997 | (EP) | F16H/41/26 |
| 464639 | 4/1937 | (GB) . | |
| 5-215199 | 8/1993 | (JP) | F16H/41/26 |

* cited by examiner

*Primary Examiner*—Edward K. Look
*Assistant Examiner*—Michael Leslie
(74) *Attorney, Agent, or Firm*—Cohen, Pontani, Lieberman & Pavane

(57) ABSTRACT

A stator wheel for a hydrodynamic torque converter comprises a stator wheel hub arrangement and a plurality of stator wheel blades arranged successively in the circumferential direction of the stator wheel hub arrangement. Each stator wheel blade has a radial inner flow-around profile area and a radial outer flow-around profile area such that a flow-around profile in the radial outer flow-around profile area differs from a flow-around profile in the radial inner flow-around profile area. A first cover ring surrounds the stator wheel hub arrangement and is connected with the stator wheel blades is arranged in radial transition area between the radial inner flow-around profile area and the radial outer flow-around profile area

14 Claims, 3 Drawing Sheets

STATOR WHEEL FOR A HYDRODYNAMIC TORQUE CONVERTER

BACKGROUND OF THE INVENTION

1. Field of the Invention

The present invention is directed to a stator wheel for a hydrodynamic torque converter comprising a stator wheel hub arrangement and a plurality of stator wheel blades arranged successively in the circumferential direction on the stator wheel hub arrangement. Each stator wheel blade has a radial inner flow-around profile area and a radial outer flow-around profile area and the flow-around profile in the radial outer flow-around profile area differs from the flow-around profile in the radial inner flow-around profile area.

2. Description of the Related Art

Hydrodynamic torque converters are generally used for transmitting torque in drivetrains of motor vehicles, especially motor vehicles with an automatic transmission, and use the fluid circulating within the torque converter to transmit torque between an impeller wheel and a turbine wheel of the torque converter. The flow of fluid exiting the turbine wheel is conducted into the impeller wheel via a stator wheel. This type of torque converter must be capable of performing the torque transmission coupling function or converter function over a wide range of operating states of a drive system. A high starting conversion is required particularly in the starting range in which the turbine wheel is initially at a standstill and only the impeller wheel is driven by the engine. However, a very high efficiency is required in the normal driving state in which the ratio of the turbine speed to the impeller speed is in a range of greater than 0.8. The different components used in a torque converter, in particular the turbine, impeller and stator, may have configurations which are adapted to the respective requirements, especially in the area of their respective blades. However, since the torque conversion on the one hand and the torque transmission without conversion on the other hand require different blade geometries to achieve optimum function in each particular case, compromises must be made so that the blades in torque converters have acceptable characteristics for both the starting range and normal driving operation. Accordingly, it is known, for example, to construct the stator wheel blades in such a way that they have a blade flow-around profile designed for the starting range in a radial inner area and a flow-around profile designed for normal driving operation or continuous operation in the radial outer area. A continuous transition of the profile takes place between the radial inside and radial outside of the stator wheel. The final result of this compromise is that the torque converter has no optimum characteristic for virtually any operating state.

A prior art torque converter is disclosed in EP 0 846 894 A2 in which the stator wheel blades are divided into a radial inner area and a radial outer area. In the radial inner area, the blades have an inner profile which is optimized essentially for the starting operation requirements. This inner profile extends approximately up to the radial longitudinal center of the blades and passes, via a step, into an outer flow-around profile which is designed for continuous operation in the radial outer area. However, unwanted flow mixtures occur at the step between the inner profile and the outer profile.

SUMMARY OF THE INVENTION

It is an object of the present invention to provide a stator wheel for a hydrodynamic torque converter that is further optimized for different operating states.

According to an embodiment of the invention, this object is met by a stator wheel for a hydrodynamic torque converter comprising a stator wheel hub arrangement and a plurality of stator wheel blades arranged successively in the circumferential direction at the stator wheel hub arrangement. Each of the plural stator wheel blades has a radial inner flow-around profile area and a radial outer flow-around profile area and the profile of the radial outer flow-around profile area differs from a profile of the radial inner flow-around profile area.

It is further provided in the stator wheel according to the invention that a first cover ring surrounding the stator wheel hub arrangement and connected with the stator wheel blades is provided in a radial transition area between the radial inner flow-around profile area and the radial outer flow-around profile area.

The separation of the two flow-around profile areas by the first cover ring divides the stator blade into two flow areas. A first flow area, i.e., the radial inner flow area, is optimized for a different operating state than the second flow area, i.e., the radial outer flow area. The cover ring prevents unwanted flow mixtures which occur in the transition area between the radial inner flow-around profile area and the radial outer flow-around profile area in the prior art devices because of the step-like change in the profile that exists in the prior art devices. The efficiency of a torque converter is increased through the integration of a stator wheel according to the invention.

When a second cover ring connected with the stator wheel blades is further provided at a radial outer end area of the stator wheel blades, a virtually completely closed flow channel system is provided for the radial outer flow-around profile area as well as for the radial inner flow-around profile area. This embodiment further improves flow characteristics and consequently improves the efficiency of the stator wheel.

A first stator wheel blade portion comprising the radial inner flow-around profile area may be formed between the stator wheel hub arrangement and the first cover ring, and a second stator wheel blade portion comprising the radial outer flow-around profile area may be provided between the first and second cover rings.

Different configurations may be realized by using the first cover ring and by dividing the individual blades into first, i.e., inner blade portions and second, i.e., outer blade portions which is possible because of the first cover ring. For example, a second stator wheel blade portion may adjoin at least a first stator wheel blade portion in a radially flush manner. Alternatively, the first stator wheel blade portions and the second stator wheel blade portions may be at least partially offset relative to one another in the circumferential direction.

Furthermore, the separation of the inner flow-around profile area from the outer flow-around profile area by the first cover ring enables a free selection of the quantity of respective blade portions in each of these areas. More specifically, a larger quantity of blade portions may be provided in the outer area than in the inner area.

Many embodiments are possible for the cover ring. The choice of the various possible embodiments of the first cover ring to be used depends among other things on the manufacturing method to be selected for producing the stator wheel. In particular, the production of a stator wheel by an axial drawing method makes it possible to construct the stator wheel integral with the fist cover ring. However, a disadvantage in this respect consists in that blades which overlap one another in the circumferential direction cannot be produced by the axial drawing method. However, this configuration may be realized by using a radial drawing method. To ensure in this case also, for example, that the flow turbulence which compulsorily occurs due to the stepped transition in the prior art is prevented in the transition area between the radial inner flow-around profile area and the radial outer flow-around profile area, it is suggested according to another feature of the present invention that a profile transition area with an essentially continuous transition between the flow-around profile of the radial inner flow-around profile area and the flow-around profile of the radial outer flow-around profile area is provided between the radial inner flow-around profile area and the radial outer flow-around profile area.

Since the effect of the radial outer area of the flow circuit is generally strengthened in torque converters when there is a relatively large speed difference between the impeller wheel and the turbine wheel, the flow-around profile of the radial inner flow-around profile area is designed for starting operation of a torque converter in the preferred embodiment. The radial inner flow-around profile area (in this case with reference to the axis of rotation of the torque converter) enters into an operative connection in contact with the radial outer fluid components with reference to the fluid flow circulation.

In a corresponding manner, it is advantageous when the flow-around profile of the radial outer flow-around profile area is designed for a continuous operation of the torque converter.

In the individual flow-around profile areas, it is preferably provided that the flow-around profile of the radial inner flow-around profile area and/or the flow-around profile of the radial outer flow-around profile area are/is essentially constant in the radial direction. As a result of manufacturing methods, there is a small bevel or taper when removed from the mold when produced by a radial drawing method.

According to a further independent feature of the present invention, a stator wheel for a hydrodynamic torque converter comprises a stator wheel hub arrangement, a first stator wheel working area surrounding the stator wheel hub arrangement and having a plurality of first stator wheel blade portions arranged successively in the circumferential direction, a second stator wheel working area surrounding the first stator wheel working area and having a plurality of second stator wheel blade portions arranged successively in the circumferential direction, and a dividing ring area which surrounds the hub arrangement and divides the first stator wheel working area from the second stator wheel working area.

It has been shown that dividing the stator wheel into two different radial flow areas and dividing these areas by a cover ring allows a great number of different possible arrangements for adapting the stator wheel to different operating characteristics in an optimum manner. As was already stated, it is possible, for example, to design the radial inner area (again with reference to the axis of rotation of the converter) for the starting state and to design the radial outer area for normal driving operation. The optimization for different operating states in the individual radial areas may be effected in different ways. For example, as was already described, it is possible to provide different flow-around profiles of the stator wheel blades in the different areas. Alternatively or in addition, however, a second stator wheel blade portion may be arranged so that it does not follow an at least first stator wheel blade portion in the radial direction in a flush manner. The quantity of first stator wheel blade portions may also differ from the quantity of second stator wheel blade portions.

The present invention is further directed to a hydrodynamic torque converter with a stator wheel which is constructed in the manner described above.

BRIEF DESCRIPTION OF THE DRAWINGS

In the drawings wherein like reference characters denote similar elements throughout the several views.

DETAILED DESCRIPTION OF THE PRESENTLY PREFERRED EMBODIMENTS

Figure 1:
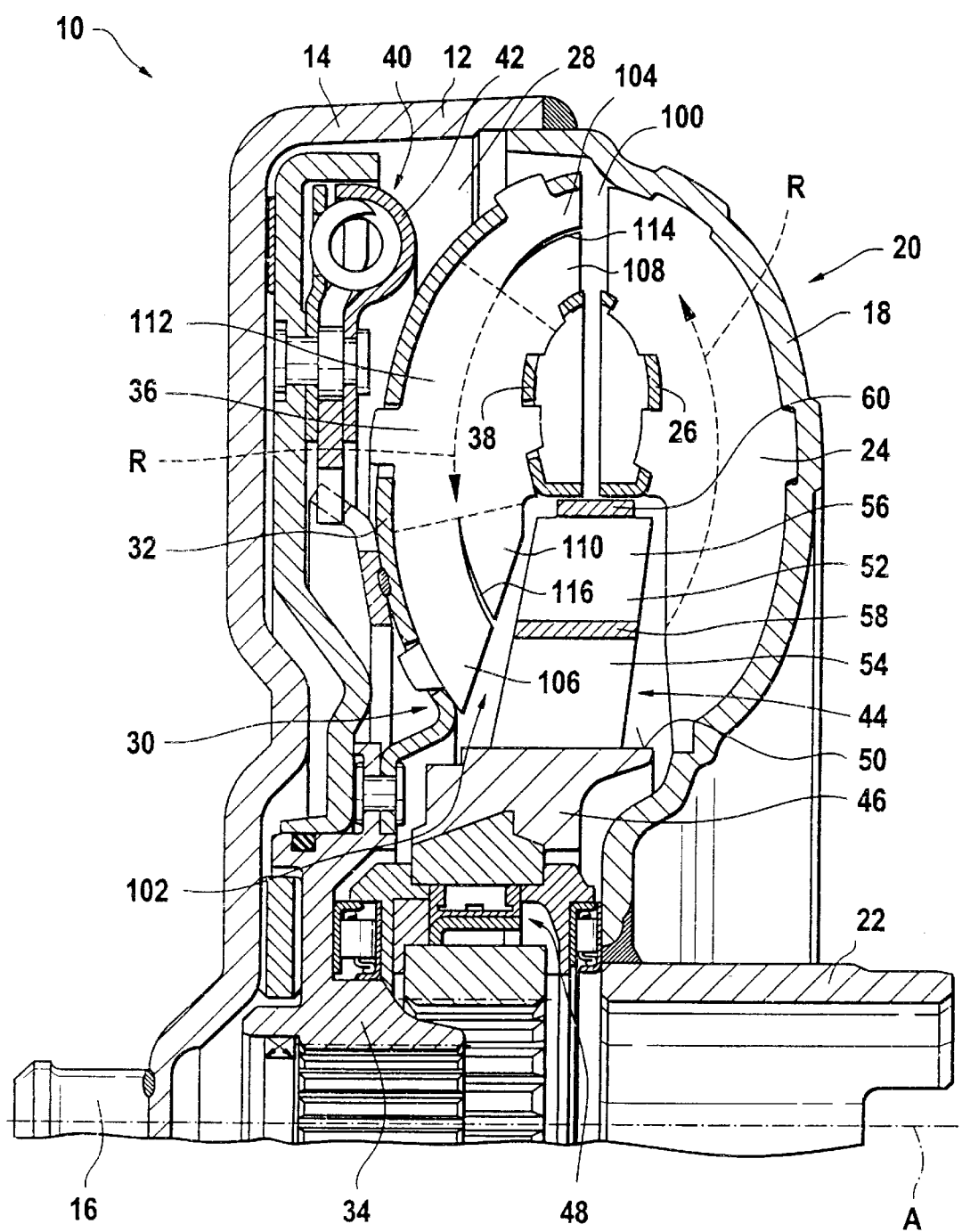
FIG. 1 is a partial longitudinal sectional view of a torque converter containing a stator wheel according to an embodiment of the invention.

FIG. 1 shows a torque converter 10 according to an embodiment of the present invention having a converter housing 12 which includes a housing cover 14. A radial inner side of the housing cover 14 is connected with a pilot pin 16 for centering the torque converter 10 with respect to a drive shaft. The torque converter 10 is further coupled with the drive shaft so as to be fixed with respect to rotation relative to it by a connection arrangement which is not shown in the drawings. The converter housing 12 further comprises an impeller wheel outer shell 18 of a impeller wheel 20. A radial inner side of the impeller wheel outer shell 18 is connected to an impeller wheel hub 22 and carries a plurality of impeller wheel blades 24 which follow one another in the circumferential direction. The sides of the impeller wheel blades 24 remote from the impeller wheel outer shell 18 are also connected to an impeller wheel inner shell 26. The torque converter 10 further comprises a turbine wheel 30 arranged in the interior 28 of the torque converter 10 and includes a turbine wheel outer shell 32 connected with a turbine wheel hub 34 for common rotation about an axis of rotation A. The turbine wheel outer shell 32 carries a plurality of turbine wheel blades 36 which are also connected to a turbine wheel inner shell 38 at sides of the turbine wheel blades 36 that are remote from the turbine wheel outer shell 32. The turbine wheel 30 may be coupled in a known manner with the converter housing 12 for common rotation about the axis of rotation A and accordingly for bypassing the torque converter 10 via a lockup clutch 40 which may further contain a torsional vibrating damper 42. The coupling is achieved by increasing the fluid pressure in the converter interior 28.

A stator wheel 44 is provided between the turbine wheel 30 and the impeller wheel 20 having a stator wheel hub arrangement 46 which may be rotatably mounted, in a known manner on a support shaft (not shown) or the like such, for example, as via a freewheel arrangement 48 for rotation about the axis of rotation A. At an outer surface 50 with reference to the axis of rotation A, the stator wheel hub arrangement 46 carries a plurality of stator wheel blades 52 arranged successively in the circumferential direction. According to the present invention, the stator wheel blades 52 are divided into a radial inner area 54 and a radial outer area 56. The stator blades have a first flow-around profile at the radial inner area 54 and second flow-around profile at the radial outer area 56. A first cover ring 58 which is approximately concentric to the axis of rotation A is located between the inner flow-around profile area 54 and the outer flow-around profile area 56 and accordingly divides the inner flow-around profile area 54 from the outer flow-around profile area 56. A second cover ring 60 is located at the radial outer side adjoining the outer flow-around profile area 56.

Respective flow channels are formed by the first cover ring 58 and the second cover ring 60 in combination with the inner and outer flow-around profile areas 54, 56. The working fluid exiting from the turbine wheel 30 and circulating in direction R flows through the flow channels. It is noted that the arrows R, in broken lines, for the respective wheels approximately designate the central thread of flow.

Figure 4A:
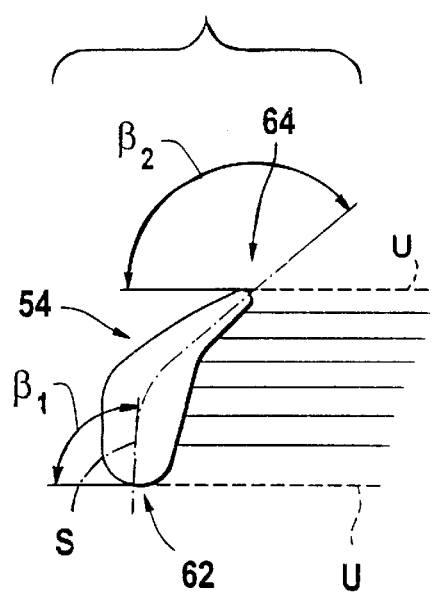
FIG. 4a is a sectional view of a stator wheel blade profile which is optimized for a starting state.
Figure 4B:
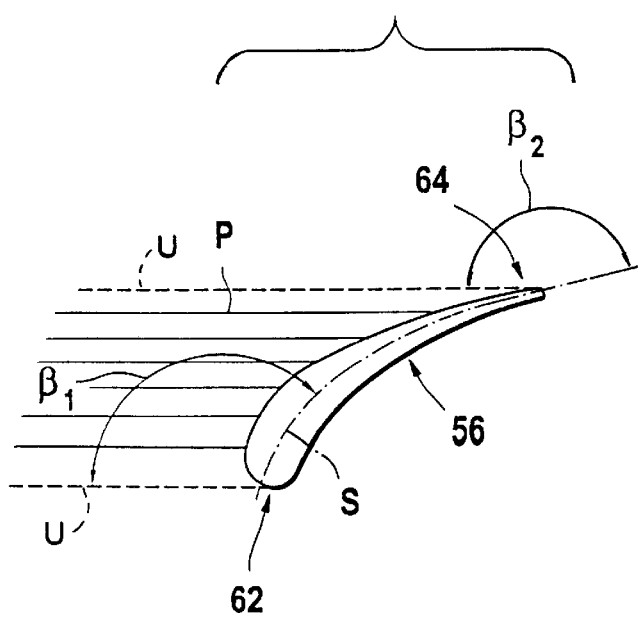
FIG. 4b is a sectional view of a stator wheel blade profile which is optimized for normal driving operation.

By dividing the stator blades 52 into the two flow-around profile areas, the flow around profile areas may be designed in an optimized manner for different operating states of the torque converter 10. For example, the radial inner flow-around profile area 54 may have the flow-around profile shown in FIG. 4a. This flow-around profile is optimized for operating states in which a high torque conversion efficiency is demanded of the torque converter 10. In a corresponding manner, the radial outer flow-around profile area 56 may have the flow around profile shown in FIG. 4b which is optimized for normal driving operation or continuous operation. A clear difference is evident in that the profile optimized for the converter function at the upstream fluid inlet area 62 between a profile line of symmetry S and a circumference line U has an appreciably smaller angle $\beta_1$ than in the case of the profile which is optimized for the normal driving state. In a corresponding manner, the profile shown in FIG. 4a has, in its downstream outlet end area 64, an angle $\beta_2$ with respect to the inclination of the line of symmetry S relative to the circumference line U, which angle $\beta_2$ is likewise smaller than in the case of the profile shown in FIG. 4b. As a result, a flow-around profile for the operating state in which the torque converter must carry out the torque conversion function is distinctly short, more robust and wider transverse to the line of symmetry S than for normal or continuous operation.

Since these two profiles are separated from on another by the cover ring 58, these profiles may be constructed to be completely independent from one another with respect to flow without generating any flow mixture problems in the radial transition area. In addition to the possibility of constructing the profiles independent from one another in the radial inner flow-around profile area 54 and in the radial outer flow-around profile area 56, the cover ring 58 enables the blade portions 54, 56 forming the respective flow-around profile areas 54, 56 to be uncoupled from one another in the circumferential direction as well as in the axial direction. This means, for example, that the outer flow-around profile areas 56 may be offset toward the rear in the direction of flow or can be offset in the circumferential direction relative to the inner flow-around profile areas 54 without inducing problems with respect to flow. In particular, the quantity of outer flow-around profile areas 56 may be selected independent from the quantity of inner flow-around areas 54. More specifically, a first quantity of outer flow-around profile areas or blade portions 56 may be greater than a second quantity of inner flow-around profile areas or blade portions 54, so that the blade spacing can also be identical in the radial outer area and the radial inner area. The opposite selection of blade-quantities is also possible. This feature of optional quantity and positioning of the different blade portions may be used to design the stator wheel in an optimized manner for different operating characteristics independent from the selected structure of the respective flow-around profiles.

Figure 2:
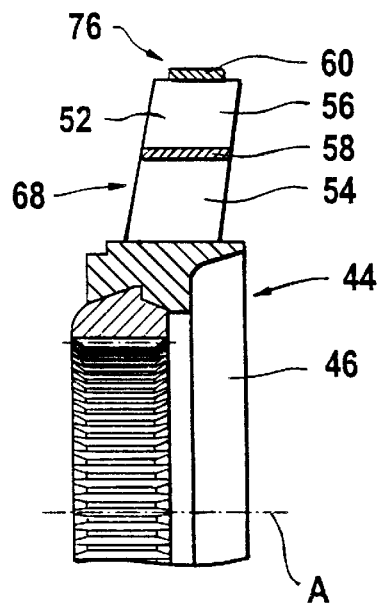
FIG. 2 is a partial longitudinal sectional view of the embodiment form of the stator wheel shown in FIG. 1.
Figure 3:
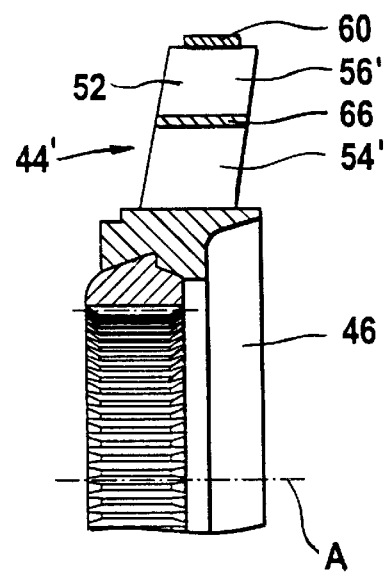
FIG. 3 is a partial longitudinal sectional view of another embodiment form of a stator wheel according to the invention.
Figure 5:
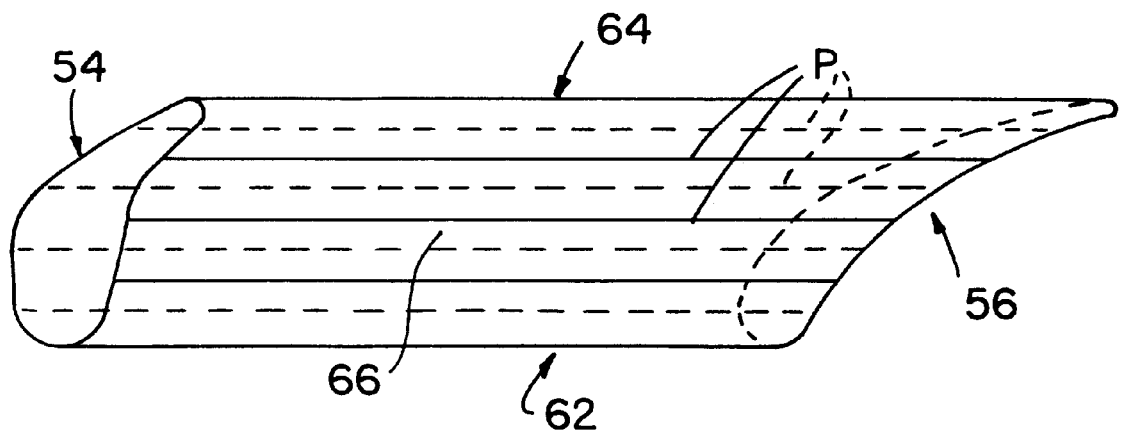
FIG. 5 is a sectional view of a stator wheel blade of FIG. 3 showing the inner flow-around profile and outer flow-around profile.

An alternative construction of a stator wheel 44' is shown in FIG. 3. This stator wheel also has stator wheel blades with a radial inner flow-around profile area 54' and a radial outer flow-around profile area 56'. However, stator wheel 44' does not have a cover ring between these two flow-around profile areas 54', 56'. To prevent the occurrence of turbulence or the like indicated by the changing blade flow-around profile, a transition area 66 is formed in which a gradual, continuous transition takes place from the radial inner flow-around profile area 54 to the radial outer flow-around profile area 56. The continuous transition of this embodiment as is indicated by the profile transition lines P shown in FIG. 5. Accordingly, the step which is used in the prior art is also avoided in this embodiment, even though a division or separation into different channel areas is not achieved. In this embodiment of a stator wheel 44', it is preferred that the inner and outer flow-around profile areas 54', 56' are approximately flush with one another on the radial outside along their front and/or rear flow-in and flow-out areas 62 and 64, respectively, so that steps are also avoided in this case. An arrangement of this kind can also lead to a further improved flow characteristic in the stator wheel 44 shown in FIG. 2.

It is noted that the stator wheel 44, 44' according to the invention may also be constructed with three or more steps. In the case of two directly successive steps within the meaning of the invention, a radial inner flow-around profile area and a radial outer flow-around profile area which are separated from one another either by a cover ring or by a continuous transition are still provided. When only two flow-around profile areas 54, 56 are provided, as is shown in FIGS. 2 and 3, it is preferable that the cover ring 58 or transition area 66 lies approximately in the longitudinal center of the blades, i.e., approximately also in the area of the central thread of flow of the fluid circulating in direction R.

Further, the first or second cover ring 58, 60 are not required to be completely closed in the circumferential direction, i.e., need not be arranged between determined blades. However, it is preferable for reasons relating to dynamic flow conditions to provide rings that are continuous and closed in the circumferential direction. Accordingly, the cover rings 58 and 60 preferably extend axially such that the flow-around profile areas adjoining them essentially do not project in the axial direction.

In connection with the above-described stator wheel according to the present invention, it may be advantageous when a configuration is provided in the area of the impeller wheel 20 and/or turbine wheel 30 which adapts these wheels to different operating characteristics. As is illustrated in FIG. 1 with respect to the impeller wheel 30 and impeller wheel blades 36, the impeller wheel blades 36 may also be divided into different working areas with respect to the flow circulation indicated by the arrows R. For this purpose, the blades 36 may be divided into upstream and/or downstream end areas 100, 102 in the flow direction of the fluid. These end areas 100, 102 are further divided into outer areas 104, 106 lying closer to the outer shell 32 and inner areas 108, 110 lying closer to the inner shell 38, for example, by a longitudinal slit 114, 116 or by a suitable deformation of the blades. The respective outer areas 104 and 106 may then be offset in the circumferential direction with respect to the axis of rotation A relative to the inner areas 108, 110, for example, in that they are bent or curved away differently from a blade base body 112. For example, in FIG. 1 the outer areas 104, 106 may be curved forward out of the drawing plane of FIG. 1 and the inner areas 108, 110 may be curved toward the rear, i.e., out of the drawing plane of FIG. 1 proceeding from the blade base body 112. In this case, various combinations of degrees of curvature or directions of curvature are possible. Accordingly, in conformity with the different flow-around profile areas 54, 56 at the stator wheel 44, a blade area which is closer to the outer shell and is adapted in an optimum manner with respect to starting requirements and a blade area which is closer to the inner shell and is adapted in an optimum manner to normal or continuous operation may also be provided in the turbine wheel 30 and/or in the impeller wheel 20. In this case, also, a stepped construction with more than two steps, for example, with three or four steps, is also possible as in the stator wheel blades.

We claim:

1. A stator wheel for a hydrodynamic torque converter, comprising:

a stator wheel hub arrangement rotatable about an axis of rotation;

a plurality of stator wheel blades arranged successively in a circumferential direction on the stator wheel hub arrangement, each of said plural stator wheel blades having a radial outer area and a radial inner area;

a first cover ring surrounding said stator wheel hub arrangement and connected to said plural stator wheel blades at a radial transition area between said radial outer area and said radial inner area;

said radial outer area of said plural stator wheel blades comprising an outer flow-around profile and said radial inner area of said plural stator wheel blades comprising an inner flow-around profile that is different from said outer flow-around profile; and a second cover ring connected to said stator wheel blades at a radial outer end of said stator wheel blades.

2. The stator wheel of claim 1, wherein said plural stator wheel blades comprise first stator wheel blade portions comprising said radial inner flow-around profile area arranged between said stator wheel hub arrangement and said first cover ring, and second stator wheel blade portions comprising said radial outer flow-around profile area arranged between said first cover ring and said second cover ring.

3. The stator wheel of claim 2, wherein said second stator wheel blade portions adjoin said first stator wheel blade portions at radially flush connections.

4. The stator wheel of claim 2, wherein said first stator wheel blade portions and said second stator wheel blade portions are at least partially offset in a circumferential direction.

5. The stator wheel of claim 2, wherein a first quantity of said first stator wheel blade portions differs from a second quantity of said second stator wheel blade portions.

6. A stator wheel for a hydrodynamic torque converter, comprising:

a stator wheel hub arrangement rotatable about an axis of rotation;

a plurality of stator wheel blades arranged successively in a circumferential direction on the stator wheel hub arrangement, each of said plural stator wheel blades having a radial outer area and a radial inner area;

a profile transition area arranged as a continuous transition on said plural stator wheel blades between said radial outer area and said radial inner area; and said radial outer area of said plural stator wheel blades comprising an outer flow-around profile and said radial inner area of said plural stator wheel blades comprising an inner flow-around profile that is different from said outer flow-around profile.

7. The stator wheel of claim 6, further comprising a first cover ring connected to said stator wheel blades between a radial outer end and a radial inner end of said stator wheel blades and a second cover ring connected to said stator wheel blades at said radial outer end of said stator wheel blades.

8. The stator wheel of claim 7, wherein each of said plural stator wheel blades comprises a first stator wheel blade portion comprising said radial inner flow-around profile area arranged between said stator wheel hub arrangement and said first cover ring, and a second stator wheel blade portion comprising said radial outer flow-around profile area arranged between said first cover ring and said second cover ring.

9. The stator wheel of claim 8, wherein said second stator wheel blade portion adjoins said first stator wheel blade portion in a radially flush connection.

10. The stator wheel of claim 8, wherein said first stator wheel blade portion and said second stator wheel blade portion are at least partially offset in a circumferential direction.

11. The stator wheel of claim 6, wherein said inner flow-around profile of said radial inner area is operatively arranged for a starting operation state of the torque converter.

12. The stator wheel of claim 6, wherein said flow-around profile of said radial outer area is operatively arranged for a continuous operation state of the torque converter.

13. The stator wheel of claim 6, wherein said inner flow-around profile of said radial inner area and said outer flow-around profile of said radial outer area are substantially constant in a radial direction.

14. A hydrodynamic torque converter comprising an impeller wheel, a turbine wheel and a stator wheel arranged between said impeller wheel and said turbine wheel, wherein said stator wheel comprises:

a stator wheel hub arrangement rotatable about an axis of rotation;

a plurality of stator wheel blades arranged successively in a circumferential direction on the stator wheel hub arrangement, each of said plural stator wheel blades having a radial outer area and a radial inner area;

one of a first cover ring and a profile transition area surrounding said stator wheel hub arrangement and arranged on said plural stator wheel blades at a radial transition area between said radial outer area and said radial inner area; and said radial outer area of said plural stator wheel blades comprising an outer flow-around profile and said radial inner area of said plural stator wheel blades comprising an inner flow-around profile that is different from said outer flow-around profile area.

\* \* \* \* \*